United States Patent [19]
Baker

[11] Patent Number: 6,053,228
[45] Date of Patent: Apr. 25, 2000

[54] HIGH IMPACT LOGO STRUCTURE FOR THE TIRE SIDEWALL

[75] Inventor: Christopher T. Baker, Peninsula, Ohio

[73] Assignee: Bridgestone/Firestone, Inc., Akron, Ohio

[21] Appl. No.: 09/061,954

[22] Filed: Apr. 17, 1998

[51] Int. Cl.[7] .................................................. B60C 13/02
[52] U.S. Cl. ...................... 152/523; 156/394.1; 425/28.1
[58] Field of Search .................... 152/523, 524; 156/116; 425/17, 28.1, 35; 40/552, 587, 596

[56] References Cited

U.S. PATENT DOCUMENTS

| | | | |
|---|---|---|---|
| 1,448,286 | 3/1923 | Comstock | 152/523 |
| 2,842,884 | 7/1958 | Stevensen | 41/24 |
| 3,518,335 | 6/1970 | Jablonski | 152/523 |
| 3,769,123 | 10/1973 | Botts et al. | 156/116 |
| 3,852,145 | 12/1974 | Kloweit | 161/18 |
| 4,198,774 | 4/1980 | Roberts et al. | 40/587 |
| 4,284,535 | 8/1981 | Lal et al. | 152/524 |
| 4,442,618 | 4/1984 | Minter et al. | 40/587 |
| 4,823,856 | 4/1989 | Roberts | 152/523 |
| 5,263,525 | 11/1993 | Yamashita | 152/523 |
| 5,303,758 | 4/1994 | Clementz et al. | 152/523 |
| 5,645,660 | 7/1997 | Attinello et al. | 152/523 |
| 5,645,661 | 7/1997 | Clementz et al. | 152/523 |

*Primary Examiner*—Geoffrey L. Knable
*Attorney, Agent, or Firm*—Michael Sand; John M. Vasuta

[57] ABSTRACT

A high impact logo structure for a tire sidewall includes a pattern formed in the body of the sidewall. The structure of the pattern creates the appearance that the pattern is recessed into the tire sidewall without actually extending inwardly past the outer surface of the sidewall. The pattern has an interior wall that projects outwardly from the outer surface of the body of the sidewall above the reference plane of the outer surface of the sidewall. The interior wall defines at least part of the pattern. An outline wall projects outwardly from the outer surface of the body of the sidewall above the reference plane of the outer surface of the sidewall. The outline wall extends about at least part of the perimeter of the interior wall of the pattern. The outline wall is spaced from the interior wall by a groove that increases the visual impact of the pattern. The lower surface of the groove is substantially coplanar with the outer surface of the sidewall. The upper surface of the outline wall is above the upper surface of the interior wall.

22 Claims, 6 Drawing Sheets

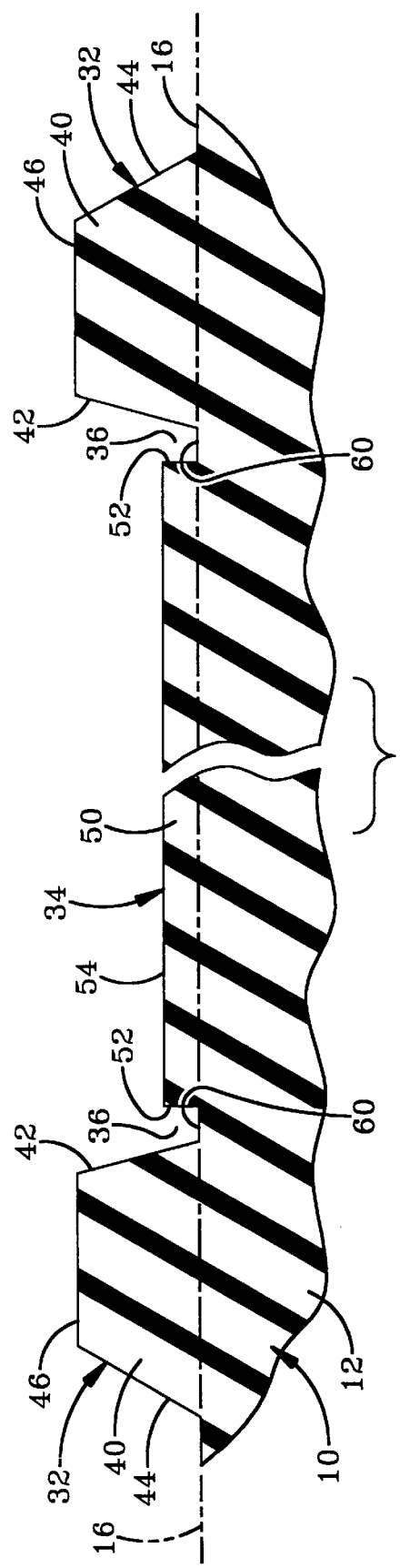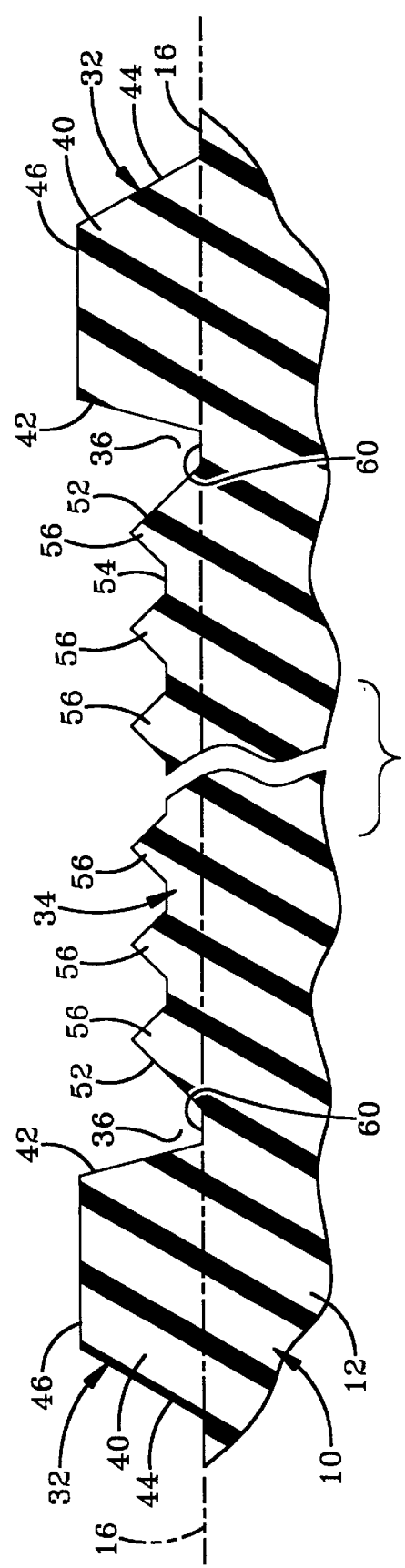

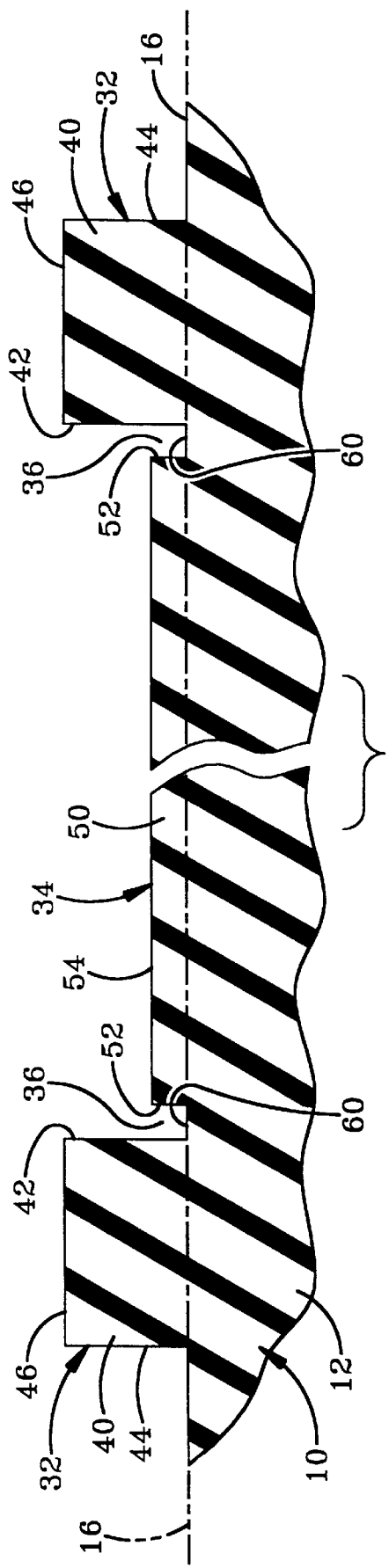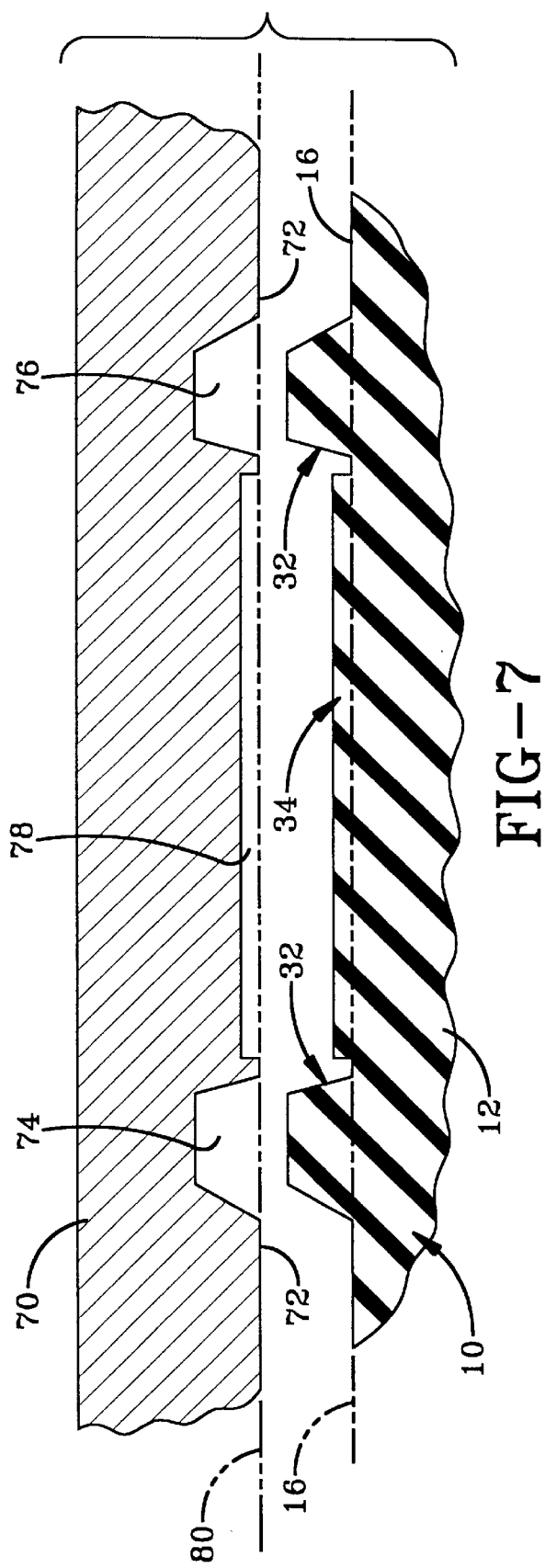

HIGH IMPACT LOGO STRUCTURE FOR THE TIRE SIDEWALL

BACKGROUND OF THE INVENTION

1. Technical Field

This invention relates generally to sidewalls of rubber tires and, more particularly, to the structure of lettering or designs formed integrally in a tire sidewall. Specifically, the present invention relates to a structure for the lettering or design in a tire sidewall that increases the visibility and impact of the lettering or design by creating the impression on the viewer that the lettering or design is recessed into the tire sidewall without actually having to recess the lettering or design into the sidewall.

2. Background Information

Tire manufacturers have placed designs, logos, letters, and/or other patterns on the sidewalls of tires for many years. Such designs and lettering typically relate to the company that manufactured the tire. For instance, a company trademark may be used on the sidewall to identify the origin of the tire and to advertise the company's product. The tire companies thus desire that the lettering or design be visible and easily readable to a person from different angles and in different light conditions.

One manner of increasing the visibility of lettering and designs on a tire sidewall is to form the lettering or design from a rubber having a color different than the color of the tire sidewall. Tire sidewalls are typically black and it is known in the art to provide lettering formed from white, blue, yellow, or red rubber to allow the lettering to be readily differentiated from the tire sidewall. Although this method of increasing the visibility of the lettering is functional, it falls from consumer favor from time to time. Forming the sidewall with lettering in a rubber having a different color than the sidewall is also more expensive than simply forming the lettering directly in the sidewall material.

One style of lettering that has been used in the past is outlined letters formed in the black rubber of the sidewall. Such black-on-black letters can be difficult to see in some conditions. The reflectivity of the rubber that is used to form the sidewalls also adds to the visibility problem. It is thus desired in the art to provide a lettering structure or design structure that allows the lettering or designs to be formed directly in the tire sidewall while being readily visible to a person at different angles and in different light conditions.

One desirable lettering structure is to recess the letters into the sidewall. Such recessing creates black-on-black letters that are readily visible. It is, however, also known in the tire industry that it is undesirable to use a lettering or design structure that requires indentations to be formed in the tire sidewall. Design structures that have indentations that extend inwardly past the outer surface of the tire sidewall require a large portion of the design mold to be removed. The process of removing the large portions of the mold is time consuming and expensive. It is thus desirable to provide a lettering or design pattern that provides the desired increased visibility to the lettering or design while not requiring any portions of the structure of the lettering or pattern to extend inwardly from the outer surface of the tire sidewall.

SUMMARY OF THE INVENTION

It is therefore an objective of the present invention to provide a high impact lettering structure for a tire sidewall that increases the visibility and impact of the pattern to the viewer.

Another objective of the present invention is to provide a high impact lettering structure for a tire sidewall that increases the visibility of the lettering while not extending inwardly from the outer surface of the tire sidewall.

Still another objective of the present invention is to provide a high impact lettering structure for a tire sidewall that can be used to create high visibility and high impact designs as well as high impact and high visibility lettering.

Yet another objective of the present invention is to provide a high impact lettering structure that can be created from a mold that is relatively easy and inexpensive to manufacture.

A further objective of the present invention is to provide a high impact lettering structure for a tire sidewall that can be combined with other visibility-enhancing structures and devices to further increase the visibility of the lettering or pattern on the tire sidewall.

Another objective of the present invention is to provide a high impact lettering structure for a tire sidewall that creates the appearance that the pattern is recessed within the body of the sidewall while the structure only projects above the surface of the sidewall.

Another objective of the present invention is to provide a high impact lettering structure for a tire sidewall which is of simple construction, which achieves the stated objectives in a simple, effective, and inexpensive manner, and which solves the problems and satisfies the needs in the art.

These and other objectives and advantages of the present invention are obtained by the tire sidewall of the present invention, the general nature of which includes a body having an outer surface defining a reference plane; a pattern formed in the body; an interior wall projecting outwardly from the outer surface of the body above the reference plane, the interior wall defining at least part of the pattern; and an outline wall projecting outwardly from the outer surface of the body above the reference plane, the outline wall extending about at least part of the perimeter of the interior wall, the outline wall being spaced from the interior wall by a groove.

BRIEF DESCRIPTION OF THE DRAWINGS

Preferred embodiments of the invention, illustrative of the best mode in which the applicant has contemplated applying the principles of the invention, are set forth in the following description and are shown in the drawings and are particularly and distinctly pointed out and set forth in the appended claims.

FIG. 4 is a sectional view taken along line 4—4 of FIG. 1;

FIG. 5 is a sectional view substantially similar to FIG. 4 depicting an alternative embodiment of the present invention;

FIG. 6 is a sectional view similar to FIG. 4 depicting an alternative embodiment of the present invention;

FIG. 7 is a schematic sectional view of the pattern of the present invention with the mold used to form the pattern of the present invention;

Similar numerals refer to similar parts throughout the specification.

DESCRIPTION OF THE PREFERRED EMBODIMENTS

Figure 1:
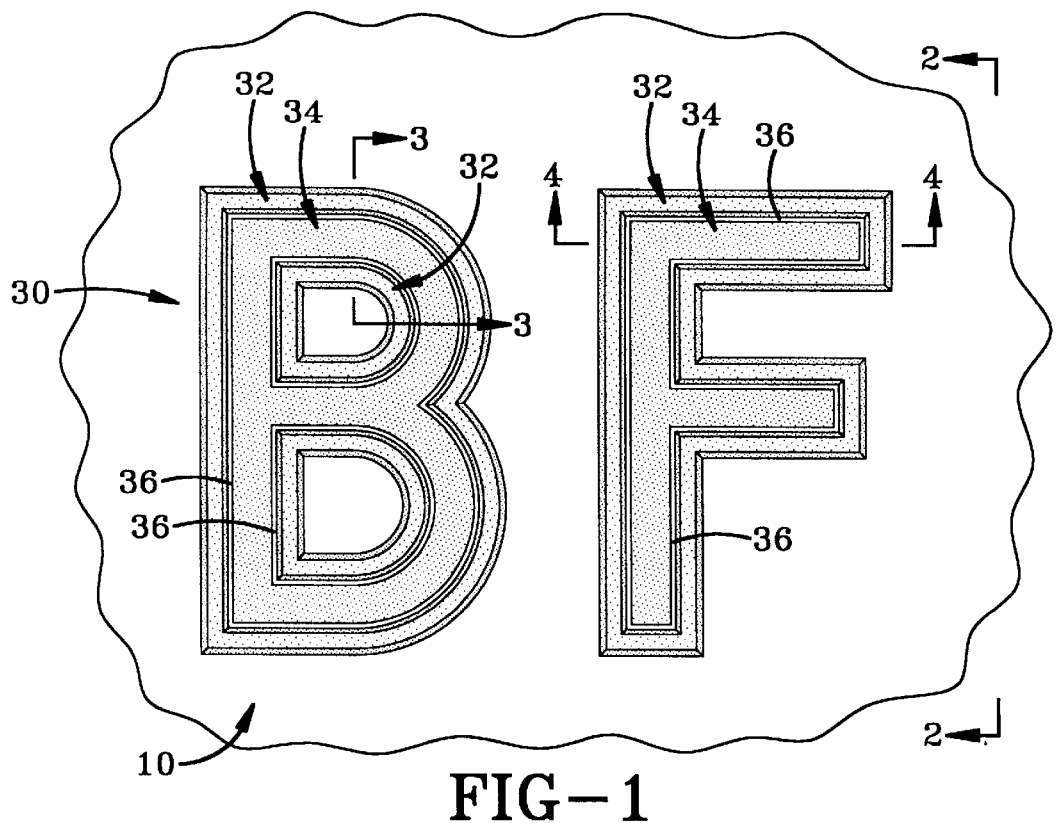
FIG. 1 is a top plan view of two letters formed in a tire sidewall from the high impact lettering structure of the present invention.
Figure 2:
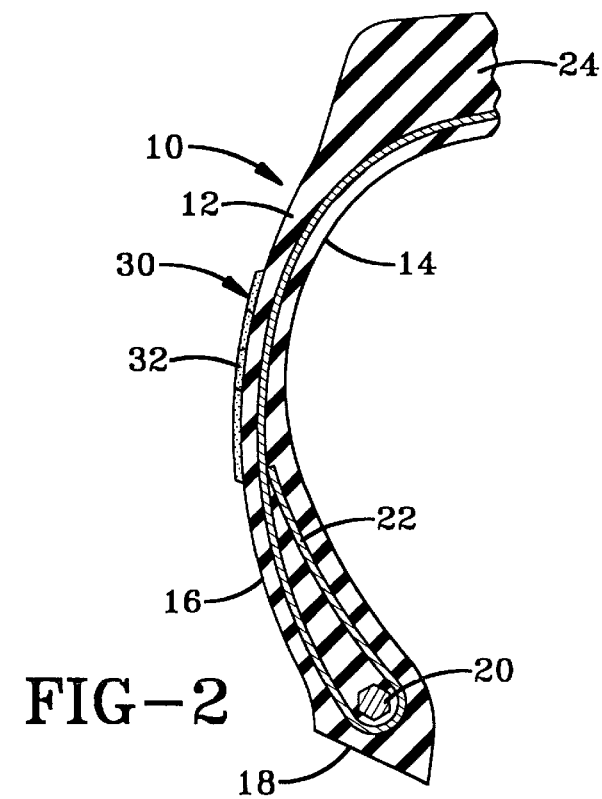
FIG. 2 is a sectional view of the tire sidewall of FIG. 1 taken along line 2—2 of FIG. 1.
Figure 3:
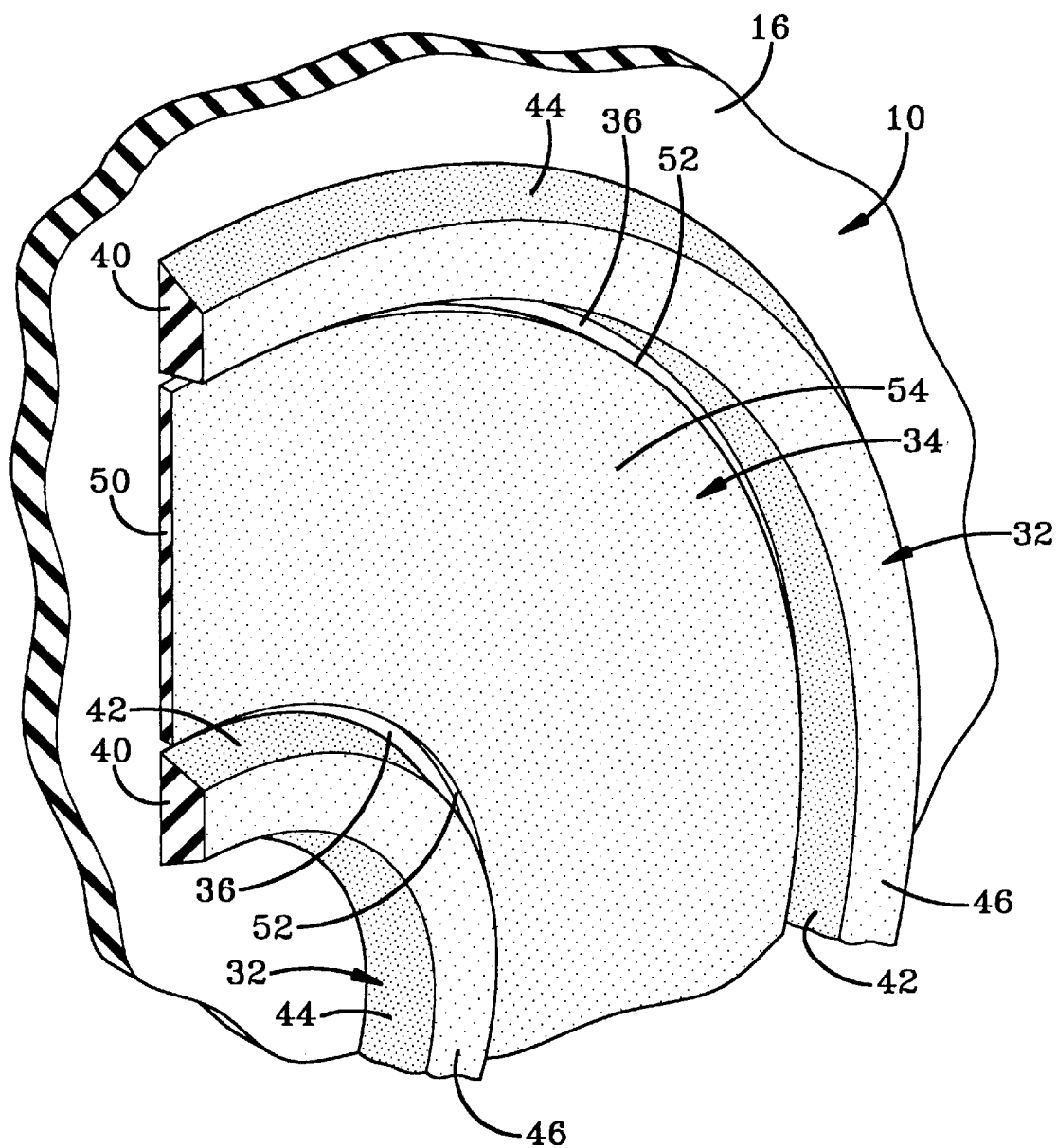
FIG. 3 is a sectional and perspective view of a portion of the high impact lettering structure taken along line 3—3 of FIG. 1.

A tire sidewall having letters with the high impact lettering structure of the present invention is depicted in the drawings and is indicated generally by the numeral 10. Tire sidewall 10 includes a body 12 having an inner surface 14 and an outer surface 16. Sidewall 10 further includes an inner end 18 in which a bead ring 20 is disposed. A tire carcass 22 is contained within body 12 and extends from inner end 18 through sidewall 10 up to the tread 24.

The design or series of letters as indicated generally by the numeral 30 is formed with the high impact structure of the present invention and protrudes outwardly from outer surface 16 of sidewall 10. Design or letter pattern 30 will be hereinafter referred to simply as pattern 30. Pattern 30 may include letters as depicted in FIG. 1, pictorial elements, geometric objects, or combinations of these items. The high impact structure of the present invention functions similarly with each type of pattern 30 that may be formed on sidewall 10.

In the embodiment of the invention depicted in the drawings, pattern 30 is represented by a pair of alphabetic characters, namely, the letters B and F. These letters are used for the purpose of providing an example only and no unnecessary limitations to the scope of the present invention are to be derived from their exemplary use. Each element of pattern 30 includes an outline wall, generally indicated by the numeral 32, and an interior wall, generally indicated by the numeral 34. Each wall 32 and 34 projects outwardly from the outer plane of body 12 in which outer surface 16 is disposed. In accordance with one of the objectives of the present invention, a groove 36 is disposed between outline wall 32 and interior wall 34. Groove 36 increases the visual impact and visibility of pattern 30. Groove 36 functions by creating a shadow line between interior wall 34 and outline wall 32. The combination of outline wall 32, interior wall 34, and groove 36 gives pattern 30 the appearance of being recessed. Although outline wall 32 extends about the entire periphery and interior periphery of each interior wall 34 in the embodiment of the invention depicted in the drawings, outline wall 32 and groove 36 may only extend about a portion of an element of pattern 30 in other embodiments of the present invention.

Outline wall 32 includes a body 40 that defines an inner surface 42, an outer surface 44 and an upper surface 46. Inner surface 42 and outer surface 44 may be disposed substantially normal to the plane of outer surface 16 of body 12 such that each surface 42 and 44 is disposed at substantially a right angle with respect to upper surface 46 as shown in FIG. 6. In other embodiments, outer surface 44 forms an obtuse angle with the plane of outer surface 16 of body 12. Similarly, inner surface 42 may also form an obtuse angle with outer surface 16. In the embodiment of the invention depicted in FIGS. 1–5, the obtuse angle formed between outer surface 44 and outer surface 16 is larger than the obtuse angle formed between inner surface 42 and outer surface 16. Upper surface 46 may be substantially parallel to outer surface 16 or may be disposed at an angle. In yet other embodiments of the present invention, outer surface 44 and inner surface 42 may converge at a peak or be joined by a rounded peak.

Interior wall 34 also has a body 50 that defines a sidewall 52 and an upper surface 54. As with outline wall 32, sidewall 52 of interior wall 34 may be substantially normal to outer surface 16 of body 12 as depicted in FIG. 4. Sidewall 52 may, however, form an obtuse angle with outer surface 16 as depicted in FIG. 5. Upper surface 54 may be substantially parallel to outer surface 16 or may be angled with respect to outer surface 16. In the embodiment of the invention depicted in FIG. 5, a plurality of ridges 56 extend upwardly from upper surface 54 to provide texture to inner wall 34. Ridges 56 may be any of a variety of ridge shapes known in the art and may be disposed parallel to one another or may be disposed in other arrangements.

In accordance with another of the objectives of the present invention, groove 36 includes a lower surface 60 that is substantially coplanar with or disposed above outer surface 16 of body 12. As can be seen in the figures, both upper surface 46 and upper surface 54 are disposed above lower surface 60 of groove 36. In the embodiment of the invention depicted in the drawings, upper surface 46 of outline wall 32 is also disposed above upper surface 54 of interior wall 34. In other embodiments of the present invention, lower surface 60 of groove 36 may be disposed above outer surface 16 of sidewall 10 with upper surface 54 of interior wall being disposed still above lower surface 60 with upper surface 46 of outline wall 32 being again disposed above upper surface 54.

In accordance with another objective of the present invention, the wall structure that forms pattern 30 may be created by a mold that is relatively inexpensive and easy to fabricate. By relatively inexpensive and easy, it is meant that large portions of mold 70 do not have to be removed in order to recess pattern 30 into sidewall 10. Large portions of mold 70 do not have to be removed because no portion of mold 70 extends across the plane 80 of outer surface 72. Mold 70 has an outer surface 72 that is pressed against outer surface 16 of sidewall 10 when pattern 30 is formed. Pattern 30 is constructed such that mold 70 may be formed simply by removing the area of material that corresponds to each of outline wall 32 and interior wall 34. For example, area 74 and area 76 must be removed from mold 70 to form outline walls 32 while area 78 must be removed from mold 70 to form interior wall 34. Removing areas 74, 76 and 78 is relatively easy because these areas are small compared to the overall surface of mold 70. Mold 70 would be significantly more difficult and expensive to manufacture if an indentation in pattern 30 extended into body 12 inside outer surface 16. In such a case, a large area of outer surface 72 of mold 70 would have to be removed to create the indentation. Such removal is generally undesired in the mold making art because it increases the expense of fabricating the mold. Pattern 30 avoids such removal and thus provides a significant benefit over other patterns that are recessed into sidewall 10.

For purposes of example only, one embodiment of the present invention has an outline wall 32 that is approximately 0.035 inches tall, an interior wall 34 that is approximately 0.010 inches tall, and a groove 36 that is approximately 0.10 inches wide at its lower surface 60. Also for purposes of example, outer surface 44 may form a 120 degree angle with outer surface 16 while inner surface 42 may form a 105 degree angle with outer surface 16. Sidewall 52 of interior wall 34 may form a 105 degree angle with outer surface 16. Other configuration of pattern 30 are also contemplated.

Figure 8:
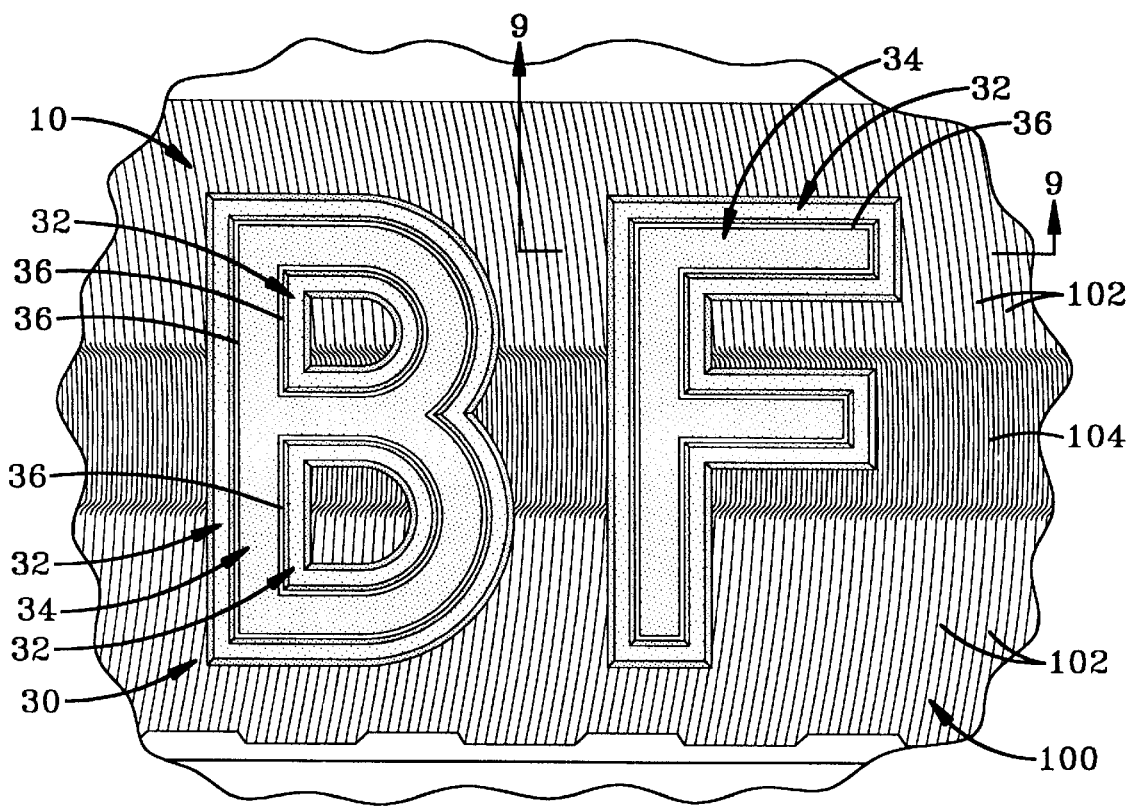
FIG. 8 is a top plan view of an alternative embodiment of the present invention with two letters formed in a textured tire sidewall with the letters having the high impact lettering structure of the present invention.
Figure 9:
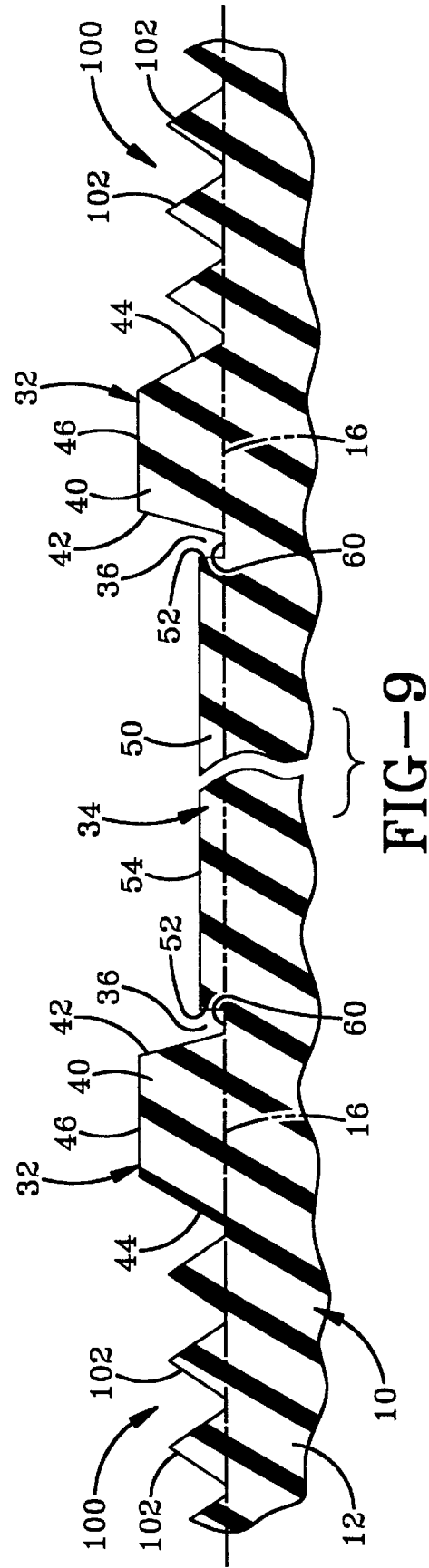
FIG. 9 is a sectional view taken along line 9—9 of FIG. 8.

Design pattern 30 is depicted in an alternative embodiment of tire sidewall 10 in FIG. 8. The structure of pattern 30 is substantially similar to the structure described above in that each element of pattern 30 includes an outline wall 32, an interior wall 34 with a groove 36 disposed between each outline wall 32 and interior wall 34. As can be seen in FIG. 9, each element 32, 34 of pattern 30 only extends above outer surface 16 of tire sidewall 10.

In the embodiment of the invention depicted in FIGS. 8 and 9, tire sidewall 10 includes a textured pattern 100 that includes a plurality of upstanding ribs 102 that are substantially parallel to one another. Pattern 100 may also include a middle section of ribs 104 that are differently shaped than ribs 102 to create the appearance of a line through pattern 100. Ribs 102 and 104 do not project above the height of outline wall 32 but may project upwardly at a distance that is larger than the height of interior wall 34. No portion of ribs 102 or 104, however, extends below outer surface 16 of tire sidewall 10. Thus, the same benefits in creating the mold are achieved by using pattern 100.

Accordingly, the improved high impact pattern for a tire sidewall is simplified, provides an effective, safe, inexpensive, and efficient device which achieves all the enumerated objectives of the invention, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved high impact pattern for a tire sidewall is construed and used, the characteristics of the construction, and the advantages, new and useful results obtained; the new and useful structures, devices, elements, arrangements, parts and combinations, are set forth in the appended claims.

I claim:

1. A tire, comprising:
   a sidewall having a body having an outer surface defining a reference plane;
   a pattern disposed on said body; the pattern being in the shape of an alphanumeric character;
   an interior wall projecting outwardly from said outer surface of said body above said reference plane; said interior wall being in the shape of said pattern;
   an outline wall projecting outwardly from said outer surface of said body above said reference plane, said outline wall extending entirely about said interior wall;
   a continuous groove extending entirely about said interior wall and between said interior wall and said outline wall, said continuous groove following the perimeter of said outline wall; said continuous groove having a bottom surface that is substantially coplanar with or spaced above said outer surface of said body.

2. The tire of claim 1 wherein said outline wall has a body having an outer surface and an inner surface.

3. The tire of claim 2 wherein said body of said outline wall further includes an upper surface that is substantially parallel with said reference plane.

4. The tire of claim 2 wherein at least one of said inner and outer surfaces is substantially normal to said reference plane.

5. The tire of claim 2 wherein at least one of said inner and outer surfaces forms an obtuse angle with said reference plane outside said body of said outline wall.

6. The tire of claim 5 wherein each of said inner and outer surfaces forms an obtuse angle with said reference plane outside said body of said outline wall.

7. The tire of claim 6, wherein said obtuse angle formed between said outer surface and said reference plane is greater than said obtuse angle formed between said inner surface and said reference plane.

8. The tire of claim 1 wherein said interior wall includes a body having a sidewall and an upper surface.

9. The tire of claim 8 wherein said sidewall of said interior wall is substantially normal to said reference plane.

10. The tire of claim 8 wherein said sidewall of said interior wall forms an obtuse angle with said reference plane outside said body of said interior wall.

11. The tire of claim 8 further comprising a plurality of ridges projecting upwardly from said interior wall.

12. The tire of claim 11 wherein said ridges are substantially parallel.

13. The tire of claim 1 wherein said groove has a lower surface, said outline wall having an upper surface, and said interior wall having an upper surface.

14. The tire of claim 13 wherein said lower surface of said groove is coplanar with said reference plane.

15. The tire of claim 13 wherein said upper surface of said outline wall is above said upper surface of said interior wall.

16. The tire of claim 15 wherein said lower surface of said groove is substantially parallel to said reference plane.

17. The tire of claim 16 wherein said lower surface of said groove is substantially coplanar with said reference plane.

18. The tire of claim 1 further comprising a plurality of ribs projecting upwardly from said outer surface outside of said pattern.

19. The tire of claim 1, wherein said interior wall, said outline wall, and said bottom surface of said groove are formed from a common material having a single color pattern.

20. The tire of claim 19, wherein the material is rubber and the single color pattern is black.

21. The tire of claim 1, wherein said sidewall of the tire is free of elements that form said pattern projecting inwardly from said outer surface of said body.

22. A tire in combination with a mold for forming a pattern on the tire sidewall, the tire sidewall having a body with an outer surface, a pattern disposed on said body; the pattern being in the shape of an alphanumeric character; an interior wall projecting outwardly from said outer surface of said body above said outer surface, said interior wall being in the shape of said pattern; said mold having an outer surface and a first recess extending into said mold from said outer surface, said first recess configured to form said interior wall; an outline wall projecting outwardly from said outer surface of said body above said outer surface of said body, said outline wall extending about at least part of the perimeter of said interior wall; said mold having a second recess extending into said mold from said outer surface of said mold, said second recess configured to form said outline wall; a continuous groove extending entirely about said interior wall and between said interior wall and said outline wall, said continuous groove having a bottom surface that is substantially coplanar with or above said outer surface of said body, said mold having a third portion configured to form said continuous groove, said third portion of said mold being substantially coplanar with or below said outer surface of said mold.

* * * * *